US011999332B2

(12) United States Patent
McGinnis

(10) Patent No.: US 11,999,332 B2
(45) Date of Patent: *Jun. 4, 2024

(54) PASSENGER SIDE DRIVING INSTRUCTOR BRAKE CONTROLLER

(71) Applicant: Driving Success, Inc., Albuquerque, NM (US)

(72) Inventor: David Wyett McGinnis, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,067

(22) Filed: Jun. 28, 2021

(65) Prior Publication Data

US 2021/0339720 A1 Nov. 4, 2021

Related U.S. Application Data

(62) Division of application No. 16/924,612, filed on Jul. 9, 2020, now Pat. No. 11,279,328.

(60) Provisional application No. 63/018,325, filed on Apr. 30, 2020.

(51) Int. Cl.
| | |
|---|---|
| *B60T 7/10* | (2006.01) |
| *B60T 7/06* | (2006.01) |
| *B60T 17/20* | (2006.01) |
| *G05G 1/54* | (2008.04) |

(52) U.S. Cl.
CPC .............. *B60T 7/102* (2013.01); *B60T 17/20* (2013.01); *G05G 1/54* (2013.01); *B60T 7/06* (2013.01)

(58) Field of Classification Search
CPC .......... G05G 1/54; G05G 1/305; G05G 11/00; Y10T 74/2022; Y10T 74/20906
See application file for complete search history.

(56) References Cited

U.S. PATENT DOCUMENTS

| | | | | |
|---|---|---|---|---|
| 5,129,492 A | * | 7/1992 | Lenz | B60W 30/18 477/27 |
| 5,542,312 A | * | 8/1996 | Peters | B60W 30/18 477/209 |
| 6,435,055 B1 | * | 8/2002 | Sato | G05G 9/02 74/562.5 |
| 2004/0217621 A1 | * | 11/2004 | McCoy | B60J 3/0204 296/97.6 |

* cited by examiner

*Primary Examiner* — Patrick Cicchino
(74) *Attorney, Agent, or Firm* — Ortiz & Lopez, PLLC; Luis M. Ortiz; Kermit D. Lopez

(57) ABSTRACT

A passenger side driving instructor brake controller can include a telescoping shaft including a first end and a second end, and a brake lever connector disposed at the first end of a telescoping shaft and adapted to be secured to a brake lever of a motor vehicle disposed within a driver-side front floorboard area of the motor vehicle. A tubular main body bent near its mid-section, the tubular main body configured to adjustably accept the second end of the telescoping shaft therein and secure the telescoping shaft with locking hardware at a fixed position within the tubular main body to enable the main body to traverse over a main console of the motor vehicle where the tubular main body is bent at its mid-section and also to extend into a passenger compartment area of the motor vehicle wherein the tubular main body can terminate at a handle area.

5 Claims, 8 Drawing Sheets

PASSENGER SIDE DRIVING INSTRUCTOR BRAKE CONTROLLER

INVENTION PRIORITY

The present design patent application claims priority as a continuation application of U.S. Nonprovisional Utility application Ser. No. 16/924,612, filed Jul. 9, 2020, entitled "Passenger Side Driving Instructor Brake Controller", which is also a continuation of U.S. Provisional Patent Application No. 63/018,325, filed Apr. 30, 2020, entitled "Passenger Side Driving Instructor Brake Controller", which are incorporated herein by reference.

FIELD OF THE EMBODIMENTS

The present embodiments generally relate to student driver training methods and system. More particularly, the embodiments relate to systems and methods for providing a passenger side driving instructor brake controller for use during beginner driver instruction. The embodiments are also related to a passenger side driving instructor brake controller that is universal in that it can be adapted for use in various makes and models of automobiles, for both right- a left-driver configuration depending on country of use.

BACKGROUND

When operating a motor vehicle, it is important to have control over its steering wheel and its brake to assure its safe operation. In the event of an emergency situation on a roadway, a driver will normally maneuver a motor vehicle by the steering wheel while slowing it down and stopping it once it is a position where it is safe along a roadside. Under most circumstance, only the driver can control both the steering wheel and brake of an automobile. Lack of brake control is not typically an issue during operation of a motor vehicle when the driver is experienced, but it can be problematic when an inexperienced driver undergoing driver training is involved. Lack of brake control by an instructor can result in a very dangerous, deadly outcome.

Teaching someone how to drive is no easy job and can also be very dangerous. Student drivers are required to obtain hours of experience behind the wheel of an automobile in accordance with today's driver licensing laws and regulations. Tens of thousands of parents, grandparents, other family members and friends supervise, guide, and teach beginning drivers behind-the-wheel of motor vehicles on roadways each day in order for the beginning driver to gain the experience necessary for licensing. Unfortunately, many novice instructors embark on the task of training a beginning driver without the benefit of instructor training fundamentals, let alone without the safety and security of a passenger-side instructor brake. Even in driver education courses professional instructor training is absolutely essential, because the driving instructors must instill the proper skills and a sense of confidence in student drivers during often stressful situations that arise when students are learning how to drive. Oftentimes the professional instructors also do not have access to, or control over, both the vehicle brake and steering wheel during training, which can still allow dangerous situations to occur.

An instructor sitting on the passenger side of a motor vehicle with a student driver behind the wheel can only manipulate the steering wheel should an emergency arise unless elaborate dual braking systems are installed in the training vehicle. Such systems can be expensive and are not in common use. An example of a dual brake system that utilizes cabling to interface a passenger brake pedal located on the passenger-side floor within the motor vehicles interior compartment with a vehicles brake lever on the driver-side compartment referred to as "Instructor Dual Control Braking System" is marketed and sold by Colorado Event Sales & Marketing Inc. (DBA Student Driver Products) of Parker Colorado (https://studentdriverproducts.com/collections/all-products/products/driving-instructors-dual-brake-set-item-86). Another system described in U.S. Pat. No. 8,607,602 issued Dec. 17, 2013 to Godwin Okoye, entitled "passenger portable safety brake", provides a less complex brake control in the form of a straight shaft attached to the brake shaft on the driver side of a motor vehicle, but which can only be manipulated from a passenger location by an instructors hand and arm that is facing inward toward the trainee and would also normally be used to control the steering wheel, thereby preventing simultaneous control by the instructor of both the steering wheel and brake.

For the foregoing reasons, what is needed for present day student driver training is improved systems and methods to assure the safety of students, instructors and the public as student drivers embark on training behind the wheel of motor vehicles in real world scenarios by enabling instructors to simultaneously control both the steering wheel and brake from the passenger seat location in motor vehicles.

SUMMARY OF EMBODIMENTS

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

An aspect of the present embodiments is to provide systems and methods to assure safe driver training can occur within automobiles in real world scenarios where an instructor can assume both steering wheel and brake control.

According to another aspect of the embodiments, a passenger side driving instructor brake controller is disclosed that includes a brake lever connector disposed at the end of a telescoping shaft adapted to be adjusted and secured within a main tubular body that is further configured to traverse over a center console of a motor vehicle from a driver side of the motor vehicle where it is connected to a brake lever and reaching into a passenger side of the motor vehicle to an handle area where the main body terminates within reach of a driving instructor's outside hand and arm.

In accordance with another aspect of the embodiments, a passenger side driving instructor brake controller including a telescoping shaft and having a first end and a second end can be provided that can include a brake lever connector disposed at the first end of a telescoping shaft adapted to be secured to a brake lever of a motor vehicle disposed within a driver-side front floorboard area of the motor vehicle, and a tubular main body bent near its mid-section, the tubular main body configured to adjustably accept the second end of the telescoping shaft therein and secure the telescoping shaft with locking hardware at a fixed position within the tubular main body to enable the main body to traverse over a main console of the motor vehicle where the tubular main body is bent at its mid-section and can thereby extend into a passenger compartment area of the motor vehicle wherein the tubular main body can terminate at a handle area within reach of a driving instructor's outside hand and arm.

In accordance with yet another feature of the embodiments, the handle area can include padding that can facilitate adequate gripping or grasping of the handle area by an instructor in order to assert control over the brake lever of the motor vehicle.

In accordance with yet another feature of the embodiments, the tubular main body can be bent in additional locations along its mid-section as needed in order to best configure it to traverse over vehicle center consoles and can also be held and controlled by an instructor sitting on the passenger side area.

In accordance with yet another feature of the embodiments, the locking hardware of the main tubular housing can include at least one of an adjustable locking screw, lever knob or detent bottom mechanism that can be manipulated to adjustably secure the telescoping shaft at various fixed positions within (i.e., extending in or out in length from as indicated by arrows) the tubular main body.

In accordance with yet another feature of the embodiments, the telescoping shaft can be rotatably attached to a brake lever connector body associated with the brake lever connector via a swivel joint coupled to the brake lever connector body. The swivel joint can enable 360-degree rotation of the telescoping shaft relative to the brake lever connector body and brake lever connector and further supports universal use of the passenger side driving instructor brake controller in right- and left-driver configured motor vehicles.

In accordance with yet another feature of the embodiments, the brake lever connector can be configured in the shape of a C-clamp with an opening wide enough to accept brake levers of multiple makes and models of motor vehicles and can also include a knob fixed to a tightening screw. The knob fixed to a tightening screw associated with the brake lever connector can be tightened onto a brake lever once the opening of the brake lever connector is placed over the brake lever just above the brake pad.

In accordance with yet another feature of the embodiments, the tubular main body can be made from rigid materials such as steel and aluminum and is not easily bendable.

In accordance with yet another feature of the embodiments, the tubular main body can be hollow so that it can accept the telescoping shaft, which can also be made of rigid materials such as steel and aluminum and also should not be easily bent.

In accordance with yet another feature of the embodiments, the tubular main body can be coated with soft rubber or plastic coating that can help prevent damage to the console and other surfaces located within the motor vehicle. The coating can be provided in a variety of decorative finishes and colors.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the detailed description herein, serve to explain the principles of the disclosed embodiments.

The particular values and configurations discussed in these non-limiting examples can be varied and are cited merely to illustrate at least one embodiment and are not intended to limit the scope thereof.

DETAILED DESCRIPTION

The embodiments now will be described more fully hereinafter with reference to the accompanying drawings, in which illustrations are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the disclosed embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"Center console" as used herein refers to a decorative center section typically found in motor vehicles that can include integrated gear shifts, cup holders, and electrical switches and can extend upward into a dashboard wherein additional operating components such as radios, a flat panel display and environmental controls are located.

Unless otherwise defined, all terms (including technical and scientific terms) used herein have the same meaning as commonly understood by one of ordinary skill in the art to which disclosed embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
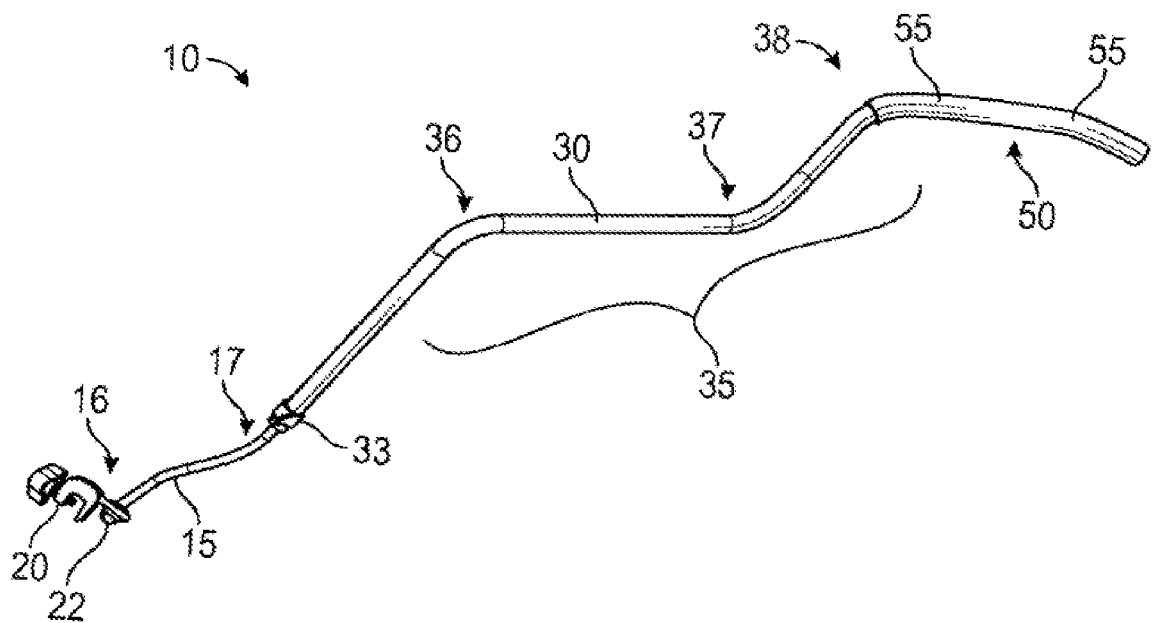
FIG. 1 illustrates an exemplary side view layout of passenger side driving instructor brake controller, in accordance with features of the embodiments.
Figure 2:
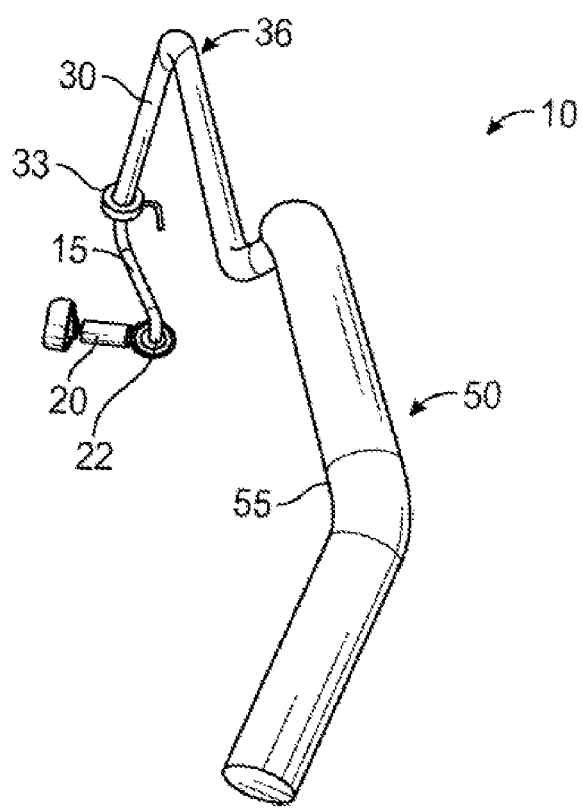
FIG. 2 illustrates an exemplary instructor end view for the layout of passenger side driving instructor brake controller of FIG. 1, in accordance with features of the embodiments.
Figure 3:
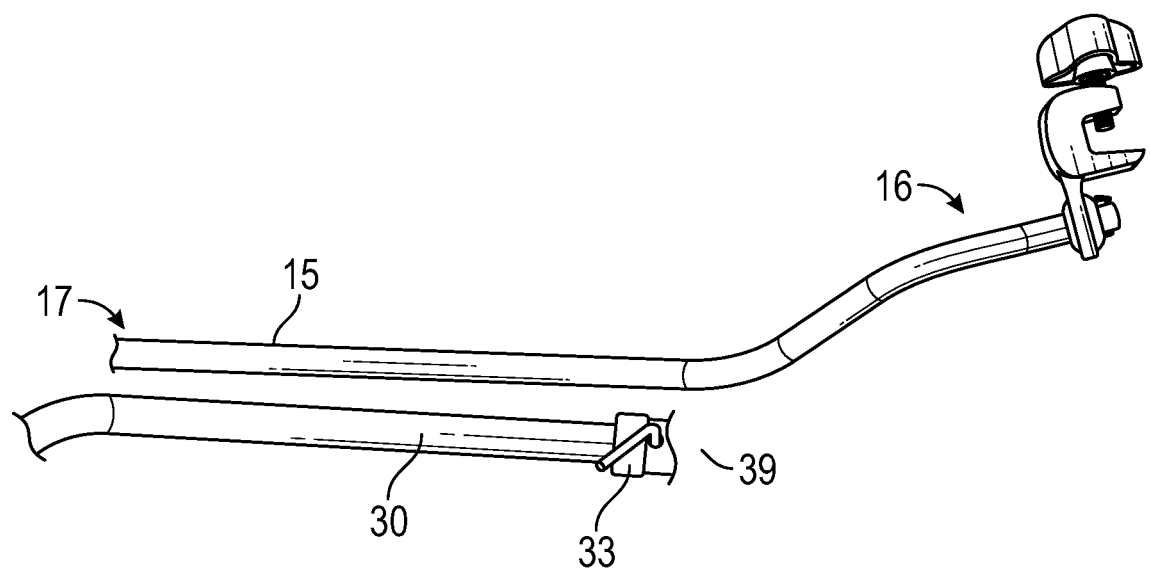
FIG. 3 illustrates an exemplary side-by-side layout of a telescoping shaft and main tubular body, in accordance with features of the embodiments.
Figure 4:
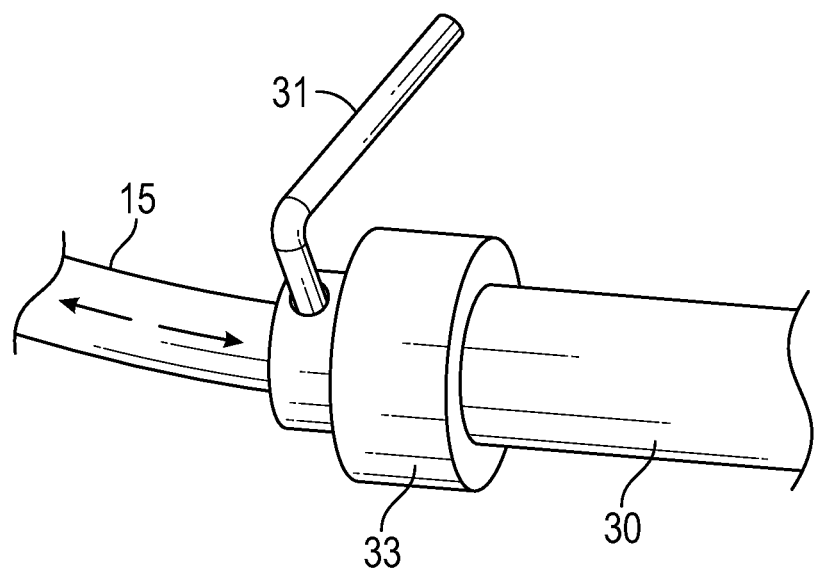
FIG. 4 illustrates a side view of a telescoping shaft and main tubular body interface point with locking hardware, in accordance with features of the embodiments.

Referring to FIGS. 1-2, FIG. 7 and FIG. 8, illustrated is a layout of a passenger side driving instructor brake controller 10, in accordance with features of the embodiments. FIG. 1 illustrates a side view of the passenger side driving instructor brake controller 10, while FIG. 1B illustrated an instructor end view of the passenger side driving instructor brake controller 10. The passenger side driving instructor brake controller 10 can include a telescoping shaft 15 including a first end 16 and a second end 17. A brake lever connector 20 can be coupled at the first end 16 of a telescoping shaft 15 and can be adapted to be secured to a brake lever 75 (see FIG. 7) of a motor vehicle 65 (see FIG. 8) typically disposed within a driver-side front floorboard area 67 (FIG. 8) of the motor vehicle 65. A tubular main body 30 can have a mid-section 35 that is bent 36 at least once in order to configure the tubular main body 30 to traverse over a center console 63 (FIG. 8) of the motor vehicle 65 and extend into the passenger side area 62 (FIG. 8) of the motor vehicle 65. The tubular main body 30 can also be bent in additional locations 37/38 along its mid-section 35 as needed in order to best configure it to traverse over vehicle center consoles 63 and also be held and controlled by an instructor sitting on the passenger side area 62.

Referring to FIGS. 1-2, FIG. 3 and FIG. 4, the tubular main body 30 can be configured to adjustably accept the second end 17 of the telescoping shaft 15 within an opening 39 (see FIG. 3) formed in the tubular main body 30 and secure the telescoping shaft 15 at its second end with locking hardware 33 located at the opening 39 formed in the tubular main body 30. The locking hardware 33 can include, for example, an adjustable locking screw 31 as shown that can be tightened and loosened to adjustably secure the telescoping shaft 15 at various fixed positions within (i.e., extending in or out in length from as indicated by arrows) the tubular main body 30. It can be appreciated that the locking hardware 33 can be provided in different means or forms including as a lever, knob, detent button mechanism, etc. The locking hardware 33 can enable the tubular main body 30 to be adjusted relative to the telescoping shaft 15 to enable the tubular main body 30 to be universal as it can traverse over a center console 63 of a motor vehicle 65 in a manner that can prevent the mid-section 35 of the tubular main body 30 to interfere with the center console 63 as it traverses over the center console 63 where the main tubular housing 30 is bent at least once at its mid-section 35. The tubular main body 30 can include enough length from where it is first bent 36 for it to extend into a passenger compartment area 62 of the motor vehicle 65 wherein the tubular main body 30 can terminate at a handle area 50. The tubular main body 30 can ideally extend at least thirty inches from the first bend in order to adequately reach over the center console 63 into the passenger compartment area 62. The handle area 50 can include padding 55 that can facilitate adequate gripping or grasping of the handle area 50 by an instructor in order to assert control over the brake 70.

The padding 55 can include soft rubber and foam products. The padding 55 will ideally assure that a driver instructor can maintain a good grip on the handle during operation of a motor vehicle by a student driver. Ideally, the padding 55 will not be slippery. The tubular main body 33 can be made from rigid materials such as steel and aluminum and is not easily bendable. The tubular main body 33 is hollow so that it can accept the telescoping shaft 15, which can also be made of rigid materials such as steel and aluminum and also should not be easily bendable. The tubular main body 30 can be coated with soft rubber or plastic coating that can help prevent damage to the console and other surfaces located within the motor vehicle. The coating can be provided is a variety of decorative finishes and colors.

Figure 5:
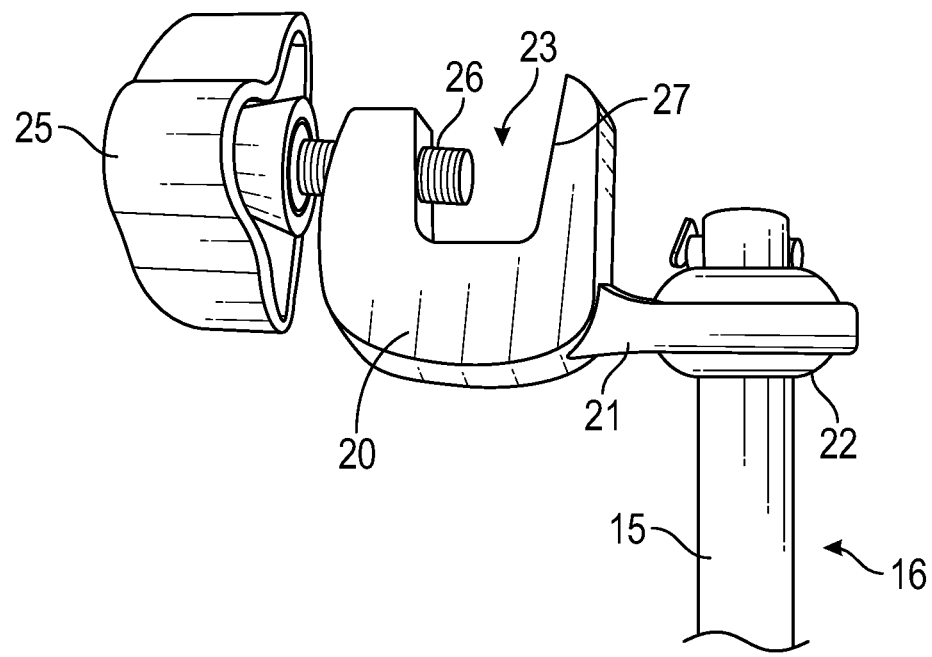
FIG. 5 illustrates side view layout for details of the brake lever connector and associated hardware, in accordance with features of the embodiments.
Figure 6:
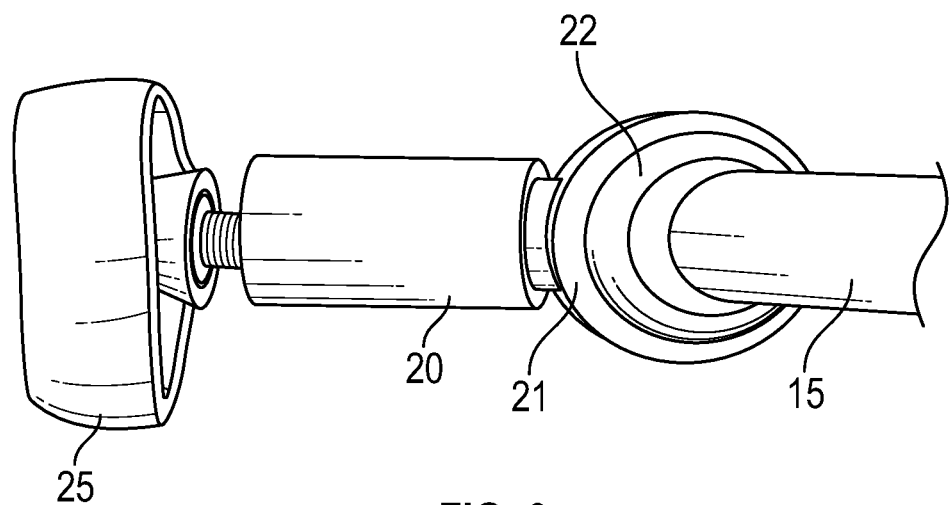
FIG. 6 illustrates a bottom view of brake lever connector and associated hardware, in accordance with features of the embodiments.
Figure 7:
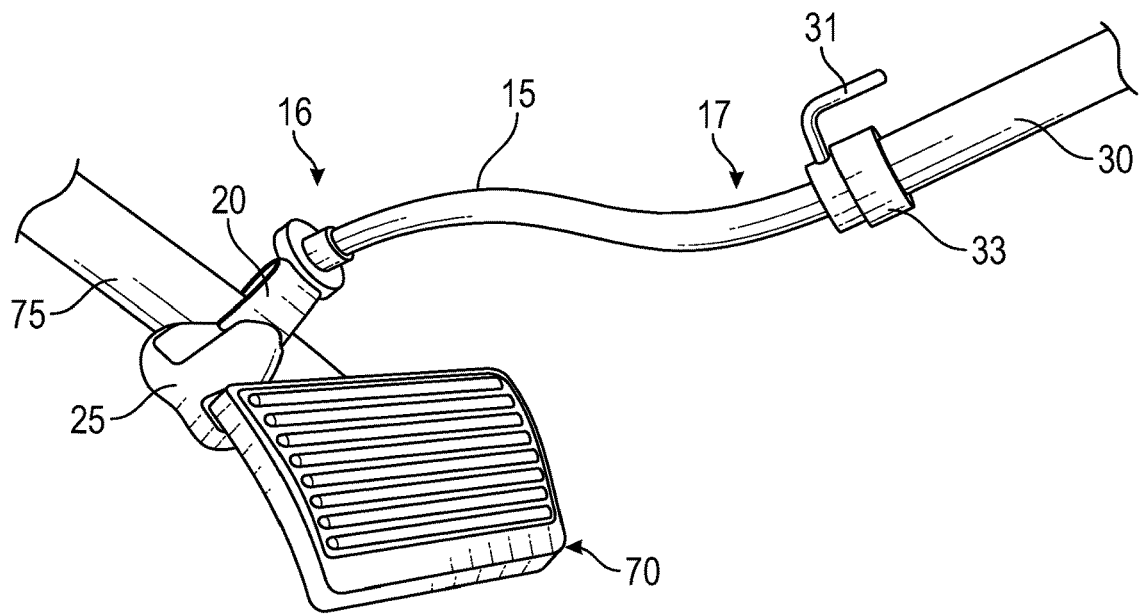
FIG. 7 illustrates installation of the telescoping shaft of a passenger side driving instructor brake controller to a brake lever, in accordance with the embodiments.

Referring to FIGS. 5-6, illustrated are details of the brake lever connector 20 and associated hardware, in accordance with the embodiments. Referring to FIG. 5, a side view is illustrated showing details of the brake lever connector 20 and associated hardware attached at the first end 16 of the telescoping shaft 15, in accordance with the embodiments. FIG. 6 illustrates a bottom view of the brake lever connector 20 where connection of the telescoping shaft 15 is shown in more detail. The telescoping shaft 15 can be rotatably attached to a brake lever connector body 21 associated with the brake lever connector 20 via a swivel joint 22 coupled to the brake lever connector body 21. The swivel joint 22 can enable 360-degree rotation of the telescoping shaft relative to the brake lever connector body 21 and brake lever connector 20. The swivel joint 22 supports universal use of the passenger side driving instructor brake controller in right- and left-driver configured motor vehicles. The brake lever connector can be configured in the shape of a C-clamp with an opening 23 wide enough to accept brake levers 75 of multiple makes and models of motor vehicles and can also include a knob 23 fixed to a tightening screw 26 to secure the brake lever connector 20 to a brake lever 75. It should be appreciated that other means of securing the brake lever connector can be utilized based on the present teaching. For example, straps, clamps and adhesives can be considered, but a tight connection to the brake lever must be assured and a knob-screw configuration is believed to provide the most secured connection of the brake lever connector 20 to a brake lever 75.

Referring again to FIG. 7, installation of a passenger side driving instructor brake controller 10 to a brake lever 75 is illustrated in accordance with the embodiments. A knob 25 fixed to a tightening screw 26 associated with the brake lever connector 20 can be firmly tightened onto a brake lever 75 once the opening 23 of the brake lever connector 20 is placed over the brake lever 75 just above the brake pad 70. Placement above the brake pad will ideally leave room for a student operator's foot to comfortably fit over the brake pad 70. Placement at least two to six inches above the brake pad should accommodate most student drivers.

Figure 8:
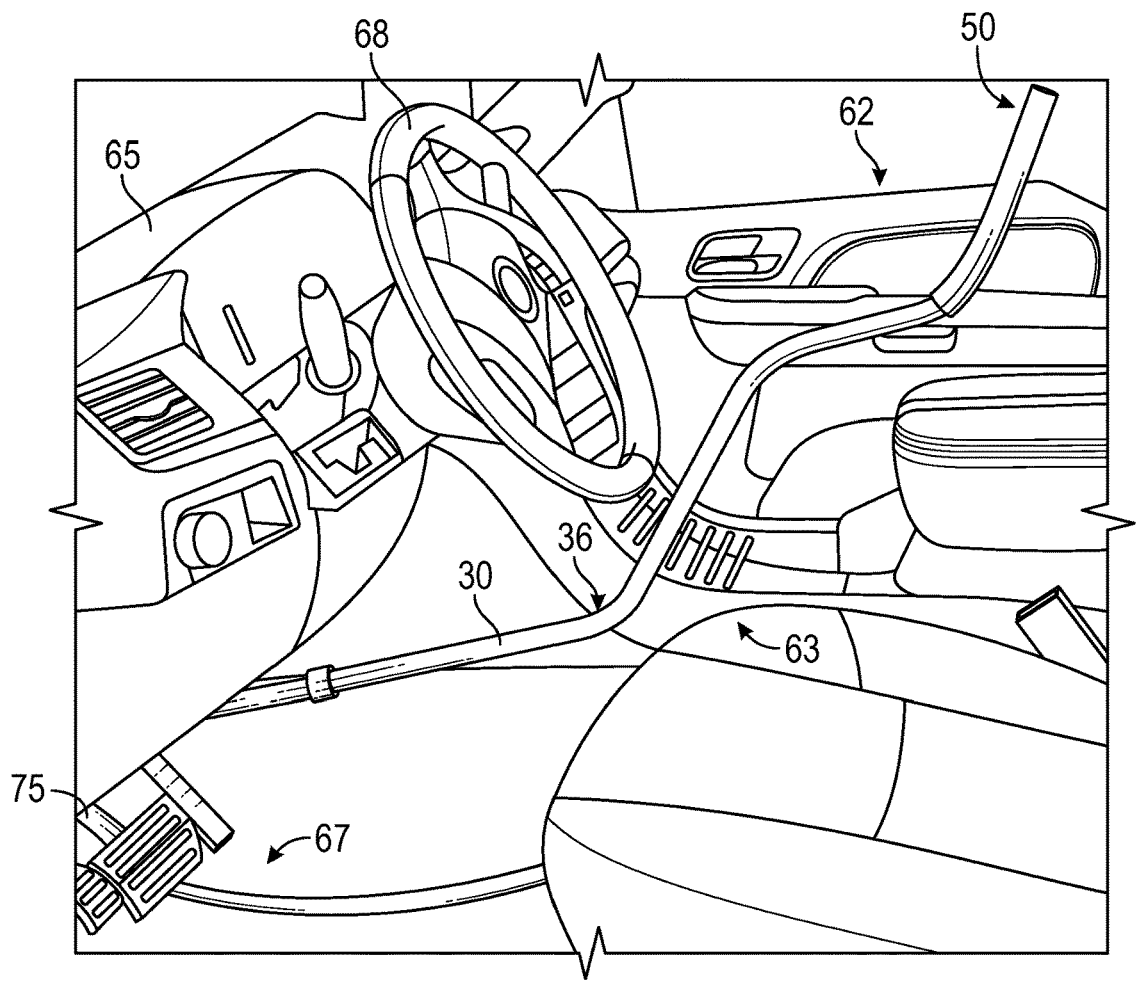
FIG. 8 illustrates the passenger side driving instructor brake controller attached to a brake lever within a motor vehicle compartment from a driver door side view and extending into the passenger compartment area of a motor vehicle, in accordance with the embodiments.

Referring again to FIG. 8, illustrated is a passenger side driving instructor brake controller 10 installed onto a brake lever 75 within a motor vehicle 65, in accordance with features of the embodiments. As illustrated in FIG. 8, the tubular main body 30 can ideally extend well into the passenger compartment area 62 while traversing over the center console 63 from a point where the tubular main body 30 is first bent 36 so that an instructor can grab and control the passenger side driving instructor brake controller 10. The instructor's outer arm and hand (e.g., right arm and hand if a left driver vehicle configuration is being used such as what is used in the United States, or the left arm and hand if the vehicle has a right driver configuration as used in the United Kingdom) will ideally be able to hold and control the a passenger side driving instructor brake controller 10 while the instructor's inner arm can remain free to simultaneously control the steering wheel during training and emergency situations. It should be appreciated that the passenger side driving instructor brake controller 10 can be universally used in either right- or left-driver vehicle configurations given the pivoting action of the brake lever connector 20 relative to the telescoping shaft 15 and tubular main body 30. Left driver (United States) configuration is described herein for exemplary purposes only and without intending to limit the scope of the present embodiments.

Figure 9:
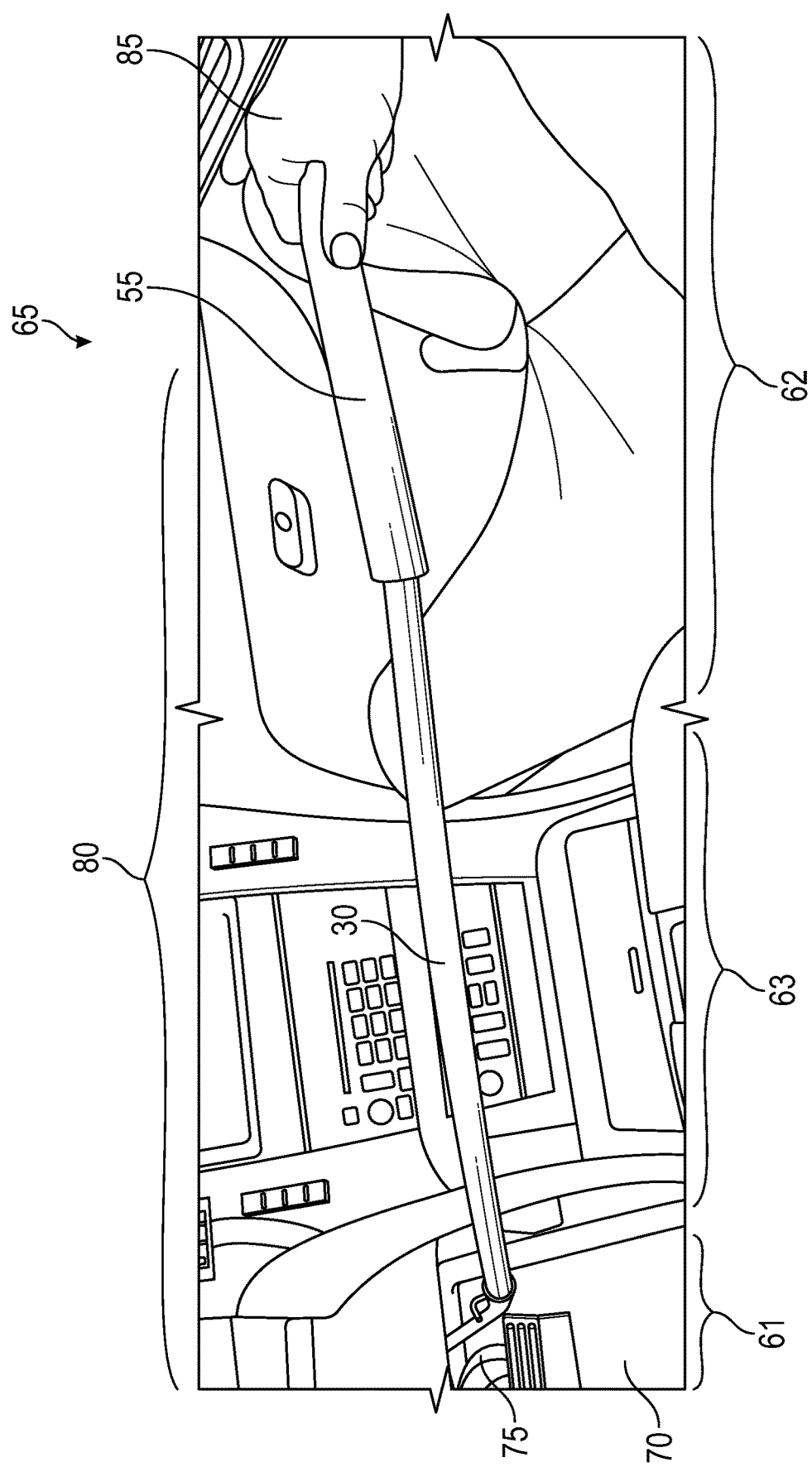
FIG. 9 illustrates a view from behind a dashboard area of a motor vehicle of a passenger side driving instructor brake controller installed onto a brake lever within a motor vehicle compartment from a driver door side view and extending into the passenger compartment area of a motor vehicle where it can be held by an instructor's right hand, in accordance with the embodiments.

Referring to FIG. 9, illustrated is a view from behind a dashboard area 80 of a motor vehicle 65 with a passenger side driving instructor brake controller 10 installed onto a brake lever 75, in accordance with the embodiments. A driver area 61, center console 63 and passenger compartment area 62 of a motor vehicle 65 are illustrated. The main tubular body 30 is shown traversing the center console 63 from the passenger side driving instructor brake controller's 10 connection to the brake lever 75 in the driver area 61 and extending well into the passenger compartment area 62 of the motor vehicle 65 wherein a right hand 85 of an instructor can hold onto a padded handle 55 and manipulate/control the brake pedal 70 located in the student section of the motor vehicle.

Figure 10A:
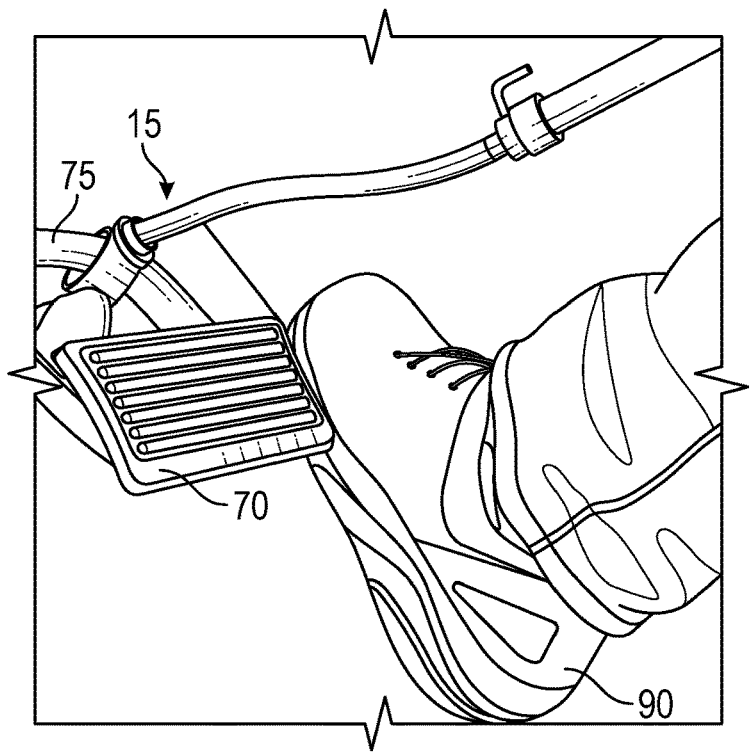
FIG. 10A-10B illustrate views of exemplary positions of a driver's foot relative to a brake pedal in a motor vehicle while a passenger side driving instructor brake controller is connected to a brake lever of a motor vehicle just above the brake footpad, in accordance with the embodiments.
Figure 10B:
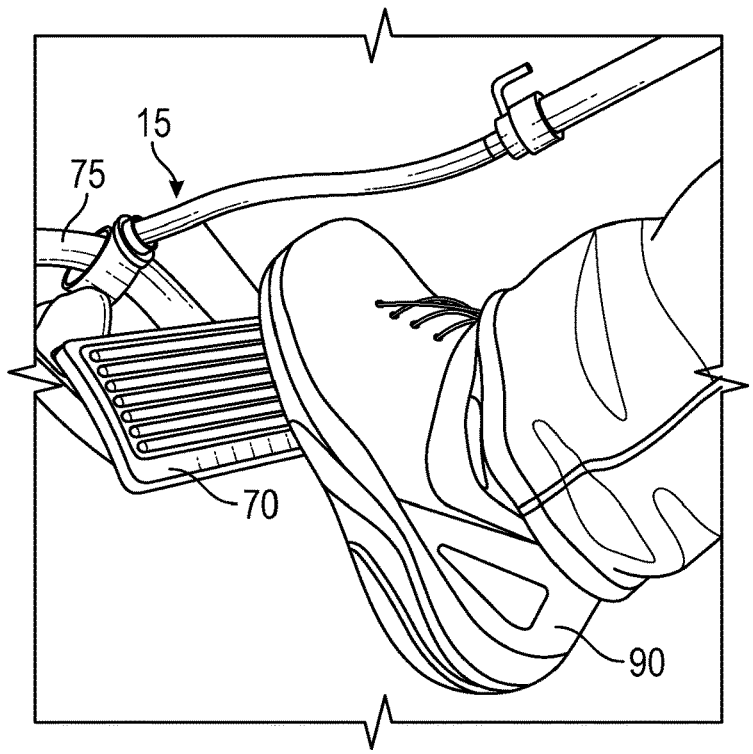

Referring to FIGS. 10A-B, illustrated are exemplary positions of a driver's foot 90 relative to a brake pedal while a passenger side driving instructor brake controller 10 is connected to the brake lever 75. Referring to FIG. 10A, a driver's foot 90 is shown off of the brake pedal 70 (presumably pressing on an accelerator). In FIGS. 10A-10B, the passenger side driving instructor brake controller 10 is located above the brake pad 70 in a manner that it does not interfere with the driver's foot. In FIG. 10A, an instructor can press down on the brake with the passenger side driving instructor brake controller 10 if necessary while simultaneously controlling the steering wheel 68 if it became necessary. Referring to FIG. 10B, the driver's foot 90 is shown pressing on the brake pedal 70. From this standpoint, an instructor can pull up on the brake pedal 70 should it become necessary to stimulate a student so that the student can release the brake pedal 70. An instructor can also assist with pressing down on the brake pedal 70 to assist a student driver in slowing or stopping the motor vehicle 65.

It should now be appreciated that it is very useful that an instructor can manipulate the brake pedal 70 with their outer hand using the passenger side driving instructor brake controller 10 leaving the inner hand free to simultaneously manipulate the steering wheel 68 should that also become necessary during a driver training scenario where a student driver becomes nonresponsive, freezes or needs assistance.

Figure 11:
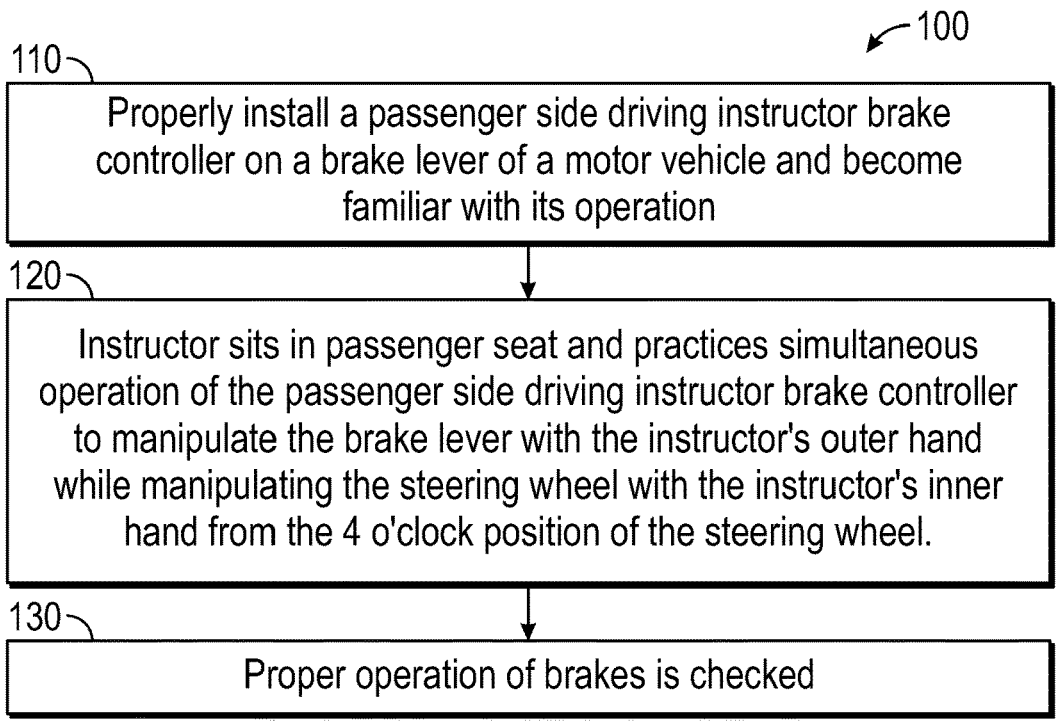
FIG. 11 illustrates a block diagram of method steps for using a passenger side driving instructor brake controller, in accordance with features of the embodiments.

There are considerations an instructor should undertake when training a student driver in a motor vehicle 65 on public roadways using a passenger side driving instructor brake controller 10 as described herein. Referring to FIG. 11, illustrated is a flow diagram 100 of a method for controlling a brake pedal 70 via connection of a passenger side driving instructor brake controller 10 to the brake lever 75 during in preparation of student driver training, in accordance with features of the embodiments. As shown in Block 110, before conducting any lesson with a student driver, it is first advisable that the instructor properly installs the passenger side driving instructor brake controller 10 onto a brake lever 75 of a motor vehicle 65 and then becomes familiar with its operation on the motor vehicle 65. An initial test drive can ideally include another licensed driver sitting in the Driver Seat of the vehicle while. As shown in Block 120, the instructor sits in the passenger seat and practices simultaneous operation of the passenger side driving instructor brake controller 10 to manipulate the brake pedal 70 with the instructor's outer hand and the steering wheel 68 with the instructor's inner hand firmly gripping the 4 o'clock position on the steering wheel. It is usually best to first practice in an empty parking lot or other location removed from the dangers and distractions of high traffic street driving areas. Proper operation of the brakes should be checked, as shown in block 130. Installation of a rearview mirror on the passenger side sun visor should also ideally be considered.

Figure 12:
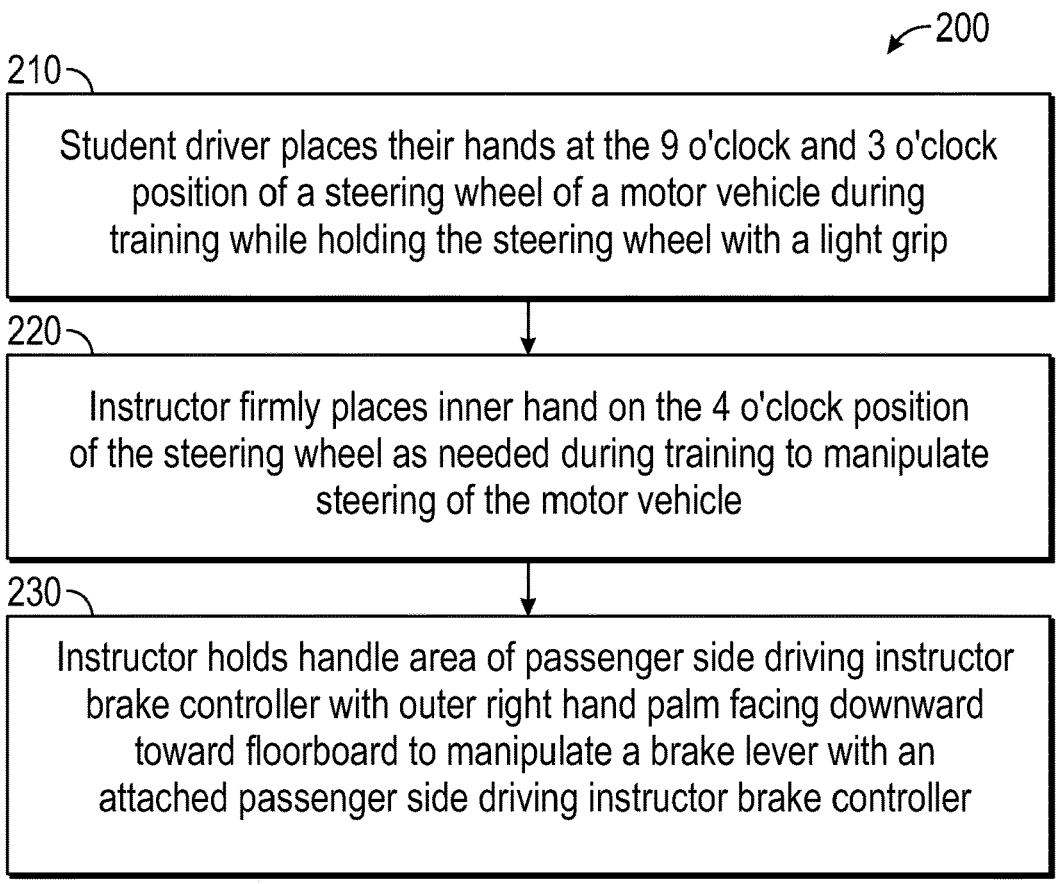
FIG. 12 illustrates a block diagram of method steps for using a passenger side driving instructor brake controller, in accordance with features of the embodiments.

Referring to FIG. 12, a flow diagram 200 is shown illustrating steps of training a student driver once on a roadway using a passenger side driving instructor brake controller 10. As shown in block 210, a student driver should ideally place their hands at the 9 o'clock and 3 o'clock positions on the steering wheel during training, holding the wheel with a light grip, to thereby allowing the instructor to firmly grab the wheel at the 4 o'clock position with the instructor's inner hand to control the vehicle should it become necessary, as show in block 220. Then as shown in block 230, the instructor should ideally hold the passenger side driving instructor brake controller 10 at its handle area 50 with the instructor's right hand, palm facing downward toward the floorboard for best manipulation of the brake lever 75 with the passenger side driving instructor brake controller 10.

Figure 13:
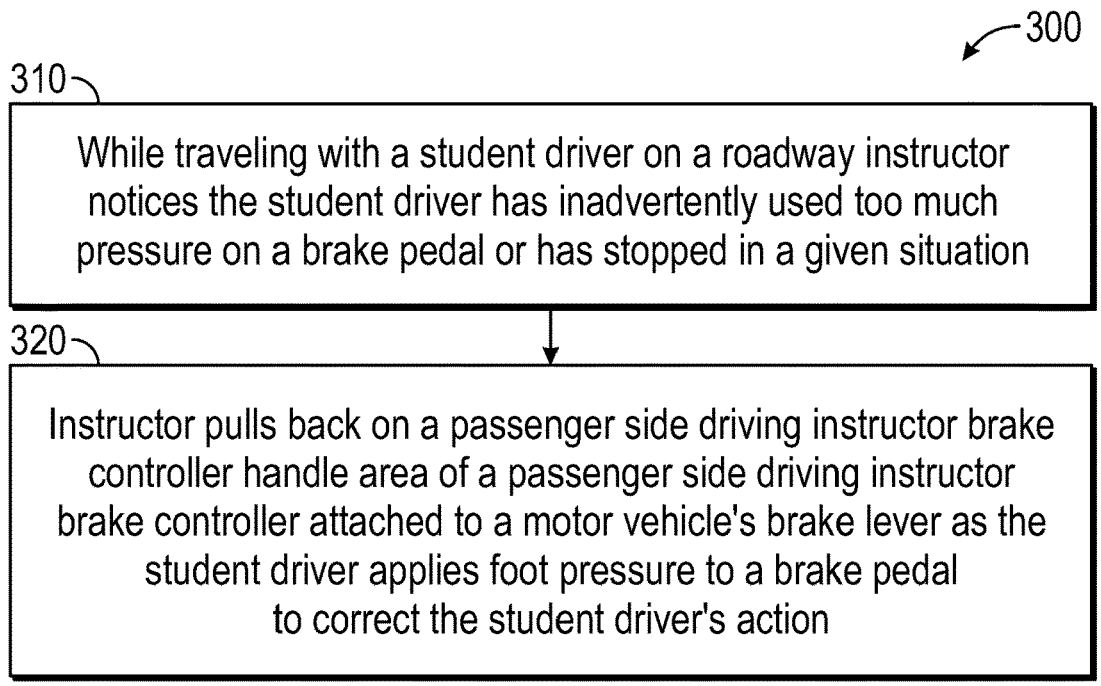
FIG. 13 illustrates a block diagram of method steps for using a passenger side driving instructor brake controller, in accordance with features of the embodiments.

Referring to FIG. 13, a flow diagram 300 is shown illustrating steps of training a student driver once on a roadway using a passenger side driving instructor brake controller 10 is installed in a motor vehicle 65. Referring to block 310, while traveling with a student driver on a roadway, instructor notices a student driver has inadvertently used too much pressure on the brake pedal or has stopped in any given situation. Instructor can pull back on the passenger side driving instructor brake controller 10 handle area as the student driver is applying foot pressure to the brake pedal 70 to correct the student driver's action, as shown in block 320.

Figure 14:
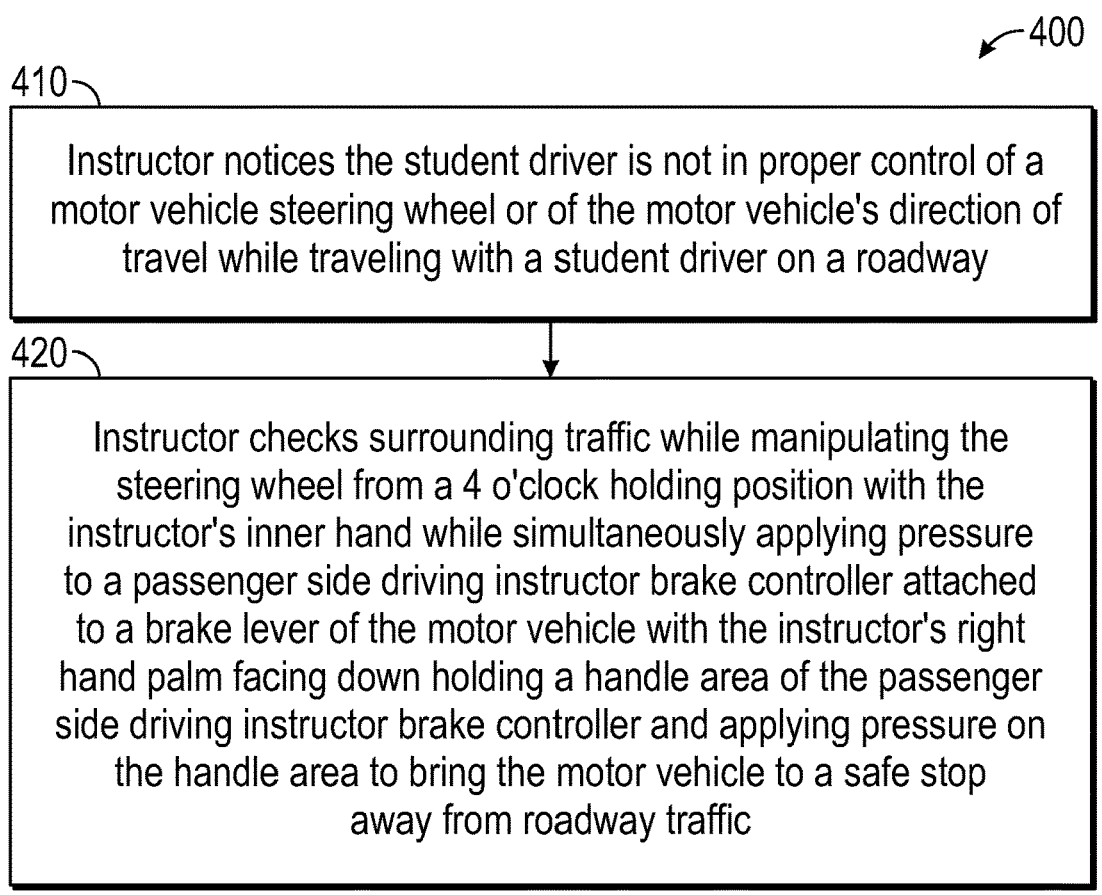
FIG. 14 illustrates a block diagram of method steps for using a passenger side driving instructor brake controller, in accordance with features of the embodiments.

Referring to FIG. 14, a flow diagram 400 is shown illustrating step for training a student driver once on a roadway using a passenger side driving instructor brake controller 10. As shown in block 410, instructor notices a student driver is not in proper control of the motor vehicle steering wheel or direction of travel. Instructor checks surrounding traffic while manipulating the steering wheel from the 4 o'clock position with the instructor's inner hand while simultaneously applying pressure to the passenger side driving instructor brake controller 10 with the instructor's right hand palm down holding the handle area of the passenger side driving instructor brake controller 10 to bring the motor vehicle to a safe stop away from roadway traffic, as shown in block 420.

It will be appreciated that variations of the above-disclosed and other features and functions, or alternatives thereof, may be desirably combined into many other different systems or applications. It should also be appreciated that various presently unforeseen or unanticipated alternatives, modifications, variations or improvements therein may be subsequently made by those skilled in the art which are also intended to be encompassed by the following claims.

The invention claimed is:

1. A method for using a passenger side driving instructor brake controller to train a student driver, the method comprising the steps of:
    obtaining a passenger side driving instructor brake controller for use in a motor vehicle having a driver-side compartment area with a steering wheel and a brake lever disposed within a driver-side front floorboard area, a passenger compartment area, and a main console separating the driver-side compartment area and the passenger compartment area, the passenger side driving instructor brake controller comprising:
        a telescoping shaft including a first end and a second end;
        a brake lever connector disposed at the first end of a telescoping shaft and adapted to be secured to the brake lever disposed within the driver-side front floorboard area of the driver-side compartment area of the motor vehicle; and
        a tubular main body having a mid-section that is bent to enable the tubular main body to traverse over the main console of the motor vehicle and extend past the main console into the passenger compartment area of the motor vehicle wherein the tubular main body terminates at a handle area that is accessible by an instructor's outer hand while the instructor is sitting in the passenger compartment area thereby freeing the instructor's inner hand for placement on and control over the steering wheel located in the driver-side compartment area, wherein the tubular main body is further configured to adjustably accept the second end of the telescoping shaft within the tubular main body and secure the telescoping shaft with locking hardware at a fixed position within the tubular main body to enable the main body to traverse over the main console of the motor vehicle where the tubular main body is bent at the mid-section and also extend into the passenger compartment area of the motor vehicle wherein the tubular main body terminates at the handle area;
    installing the passenger side driving instructor brake controller on a brake lever of a motor vehicle; and
    enabling an instructor sitting in a passenger seat of the motor vehicle practices simultaneous operation of the passenger side driving instructor brake controller to manipulate the brake lever with the instructor's outer hand on a a handle area of the passenger side driving instructor brake controller and a steering wheel of the motor vehicle with the instructor's inner hand from a 4 o'clock position on the steering wheel.

2. The method of claim 1, further comprising the steps of:
    enabling a student sitting in a driver seat of the motor vehicle places their hands at the 9 o'clock and 3 o'clock positions on the steering wheel with a light grip while training;
    enabling the instructor to place the instructor's inner hand on the 4 o'clock position of the steering wheel as needed during training to manipulate steering of the motor vehicle; and
    enabling the instructor to hold the handle area of the passenger side driving instructor brake controller with the instructor's right hand, palm facing downward toward a floorboard to manipulate the brake lever.

3. The method of claim 1, further comprising the steps of:
    enabling the instructor to notice the student driver has inadvertently used too much brake or has stopped in a given situation while traveling on a roadway; and
    enabling the instructor to pull back on the passenger side driving instructor brake controller handle area as the student driver applied foot pressure to the pedal to correct the student diver's action.

4. The passenger side driving instructor brake controller of claim 1, further configured to enable a driving instructor to pull back on the handle area as a student driver applies foot pressure to the pedal to enable correction of the student diver's action on the pedal.

5. The method of claim 1, further comprising the steps of:
    enabling the instructor to notice the student driver is not in proper control of the motor vehicle steering wheel or direction of travel of the motor vehicle while traveling on a roadway; and
    enabling the instructor to check surrounding traffic while manipulating the steering wheel from the 4 o'clock position with the instructor's inner hand while simultaneously applying pressure to the passenger side driving instructor brake controller with the instructor's right hand palm facing down holding the handle area of the passenger side driving instructor brake controller to bring the motor vehicle to a safe stop away from roadway traffic.

* * * * *